United States Patent
Yun (10) Patent No.: US 11,196,858 B2
(45) Date of Patent: Dec. 7, 2021

(54) SPAM BLOCKING METHOD, DEVICE AND PROGRAM USING CALL LOG ANALYSIS

(71) Applicant: EVAIN INC., Gwangju (KR)

(72) Inventor: Young Jung Yun, Gwangju (KR)

(73) Assignee: EVAIN INC., Gwangju (KR)

( * ) Notice: Subject to any disclaimer, the term of this patent is extended or adjusted under 35 U.S.C. 154(b) by 0 days.

(21) Appl. No.: 16/880,562

(22) Filed: May 21, 2020

(65) Prior Publication Data

US 2020/0382638 A1     Dec. 3, 2020

(30) Foreign Application Priority Data

May 31, 2019   (KR) .................. 10-2019-0064196

(51) Int. Cl.
  *H04M 3/436*   (2006.01)
  *H04M 3/42*    (2006.01)
  *G06N 20/00*   (2019.01)

(52) U.S. Cl.
  CPC ............ *H04M 3/436* (2013.01); *G06N 20/00* (2019.01); *H04M 3/42042* (2013.01); *H04M 2203/551* (2013.01); *H04M 2203/553* (2013.01); *H04M 2203/558* (2013.01); *H04M 2250/60* (2013.01)

(58) Field of Classification Search
  CPC ............ H04M 3/436; H04M 3/42042; H04M 2203/551; H04M 2250/60
  USPC .................................................... 455/415
  See application file for complete search history.

(56) References Cited

U.S. PATENT DOCUMENTS

| | | | | |
|---|---|---|---|---|
| 2008/0123823 A1* | 5/2008 | Pirzada | ............... | H04M 3/5335 379/88.11 |
| 2009/0103701 A1* | 4/2009 | Garg | ..................... | H04M 3/436 379/142.04 |
| 2010/0124916 A1* | 5/2010 | Kim | ...................... | H04M 3/436 455/418 |
| 2015/0003600 A1* | 1/2015 | Bucko | ................... | H04M 3/436 379/210.02 |
| 2018/0288221 A1* | 10/2018 | Dutkevic | ............ | H04L 63/1408 |
| 2018/0324297 A1* | 11/2018 | Kent | ..................... | G06N 20/00 |

FOREIGN PATENT DOCUMENTS

| | | |
|---|---|---|
| KR | 20090027214 A | 3/2009 |
| KR | 20100002273 A | 1/2010 |
| KR | 20100058964 A | 6/2010 |
| KR | 20110061951 A | 6/2011 |
| KR | 20170009537 A | 1/2017 |
| KR | 20180006775 A | 1/2018 |

OTHER PUBLICATIONS

Office Action issued in KR 10-2019-0064196; mailed by the Korean Intellectual Property Office dated Mar. 19, 2020.

\* cited by examiner

*Primary Examiner* — Ahmad F. Matar
*Assistant Examiner* — Jirapon Intavong
(74) *Attorney, Agent, or Firm* — Studebaker & Brackett PC (57) ABSTRACT

The inventive concept relates to a spam blocking method, and the spam blocking method includes training a spam determination module using call pattern data of an originator and a recipient secured based on call logs and re-training the spam determination module according to a maneuver of a user for an incoming call received in a recipient terminal, thus enabling spam determination customized for each user.

10 Claims, 9 Drawing Sheets

SPAM BLOCKING METHOD, DEVICE AND PROGRAM USING CALL LOG ANALYSIS

CROSS-REFERENCE TO RELATED APPLICATIONS

A claim for priority under 35 U.S.C. § 119 is made to Korean Patent Application No. 10-2019-0064196 filed May 31, 2019 in the Korean Intellectual Property Office, the entire contents of which are hereby incorporated by reference.

BACKGROUND

Embodiments of the inventive concept described herein relate to a spam blocking method in a mobile phone terminal.

A conventional spam call blocking system has operated in such a manner to block a spam call by inputting and storing a mark indicating whether a call is a spam call after a user responds to the call and sharing the mark with other users.

However, a technology related to spam calls and voice phishing calls has also evolved in accordance with the development of such a spam call blocking system, thus making it difficult for a user to identify the nature of a call, and leading to limitations in constructing the system using information input.

Most of currently known technologies still do not solve the above problems because the known technologies determine whether a call or text is a spam call or text by receiving marks indicating whether a call or text is a spam call or text from users or analyzing the contents of the text.

PRIOR ART DOCUMENTS

Patent Literature

Korea Patent Publication No. 10-2010-0002273 (2010.01.05)

SUMMARY

Embodiments of the inventive concept provide a spam blocking method using call log analysis, which trains the spam determination module to secure call pattern data of an originator and a recipient based on a call log of the recipient's terminal.

In addition, the inventive concept may provide a spam blocking method using a call log analysis, which analyzes an originator of a call received by a recipient terminal and re-trains a spam determination module according to the recipient's response to the call.

The technical problems of the inventive concept are not limited to the aforementioned problems, and any other technical problems not mentioned herein will be clearly understood from the following description by those skilled in the art.

According to an embodiment, a spam blocking method performed by a computer includes collecting a call log of a recipient terminal, collecting call pattern data of an originator and a recipient based on the call log, training a spam determination module using the call pattern data, when a call or a text is received by the recipient's terminal, analyzing, by the spam determination module, call pattern data of an originator of the call, determining whether to block the call or the text according to an analysis result and call-propensity of the recipient and providing originator information of the call or the text to the recipient's terminal, and re-training the spam determination module according to a maneuver of the recipient's terminal to the call.

In addition, the spam determination module may use a Gaussian Naive Bayes artificial intelligence logic, and the providing of the originator information may include calculating a probability that the call or the text is a spam or voice phishing call using a Naive Bayes' theorem.

In addition, the collecting of the call pattern data may include collecting the call pattern data of the originator including at least one of a daily average call origination rate of the originator, a concentration rate of originated calls during a specific time, a call response rate, a call origination rate on each time zone, a call response rate by phone number type, an activity rate on each day of week, a call origination rate for a same number, and a match rate between activities before and after a suspended period, and the call pattern data of the recipient including at least one a call response rate of the recipient, a non-identified number-call response rate, a call response rate on each time zone, a call response rate by phone number type, a call response rate on each day of week and a call response rate for a same number.

In addition, the re-training of the spam determination module may include re-training the spam determination module according to a corresponding maneuver among call response, call rejection, a call duration time after the call response, and a missed call of the recipient's terminal, and determining the call rejection when the call duration time is less than or equal to a predetermined time.

In addition, the re-training of the spam determination module may include determining whether a unresponsive call by the recipient is on purpose based on previous call history data of the recipient's terminal for a relevant originator when the recipient's terminal does not respond to the call.

In addition, the providing of the originator information may include providing an alert message to the recipient's terminal when call pattern data for a corresponding originator is less than or equal to a reference value or indicates a new number.

In addition, the spam determination module may collect call pattern data from a time point when a call log of a specific originator is re-collected after a certain suspended period and determine whether to maintain the specific originator as a same originator as an existing originator or to register the specific originator as a new originator according to a match rate between call pattern data before and after the suspended period.

In addition, the providing of the originator information may include calculating, by the spam determination module, a spam index by analyzing the originator of the call received by the recipient's terminal, and determining whether to block the received call by comparing a spam blocking level set in the recipient's terminal with the span index of the originator when a spam blocking setting is activated in the recipient's terminal.

According to an exemplary embodiment, a spam blocking device includes a collecting unit that collects a call log of a recipient terminal, and collects call pattern data of an originator and a recipient based on the call log, a spam determination module that is trained using the call pattern data to analyze an originator of a call or a text and determine whether to block the call or a text according to a call propensity of the recipient when the call or the text is received in the recipient terminal, and an information providing module that provides originator information of the call or the text to the recipient's terminal, wherein the spam determination module is re-trained according to a maneuver of the recipient's terminal to the call.

In addition to this, another method for implementing the inventive concept, another system, and a computer readable recording medium for recording a computer program for executing the method may be further provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In the specification, the terms "comprises" and/or "comprising" are intended to specify the presence of stated elements, but do not preclude the presence or addition of other elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Therefore, the first component referred to below may be a second component within the technical spirit of the inventive concept.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

A conventional spam call blocking system has operated in such a manner to block a spam call by inputting and store a mark indicating whether a call is a spam call after a user responds to the call and sharing the mark with other users.

However, a technology related to spam calls and voice phishing calls has also evolved in accordance with the development of such a spam call blocking system, thus making it difficult for a user to identify the nature of a call, and leading to limitations in constructing the system using information input.

As one of typical drawbacks, there is a problem that, when a spam call has a new phone number or is made in a new pattern, it is hard to determine whether a call is a spam call until reports by users have not been registered a predetermined number of times or more because it is determined whether or not a call is a spam call depending on the reports by the users.

The present applicant has proposed an inventive concept capable of determining whether a call is a spam call with respect to a spam call with an unknown phone number, which is made in a new pattern, by improving the shortcomings of such a conventional spam call blocking system and preventing the spam call from bypassing the blocking method.

Hereinafter, embodiments of the inventive concept will be described with reference to the accompanying drawings.

Figure 1:
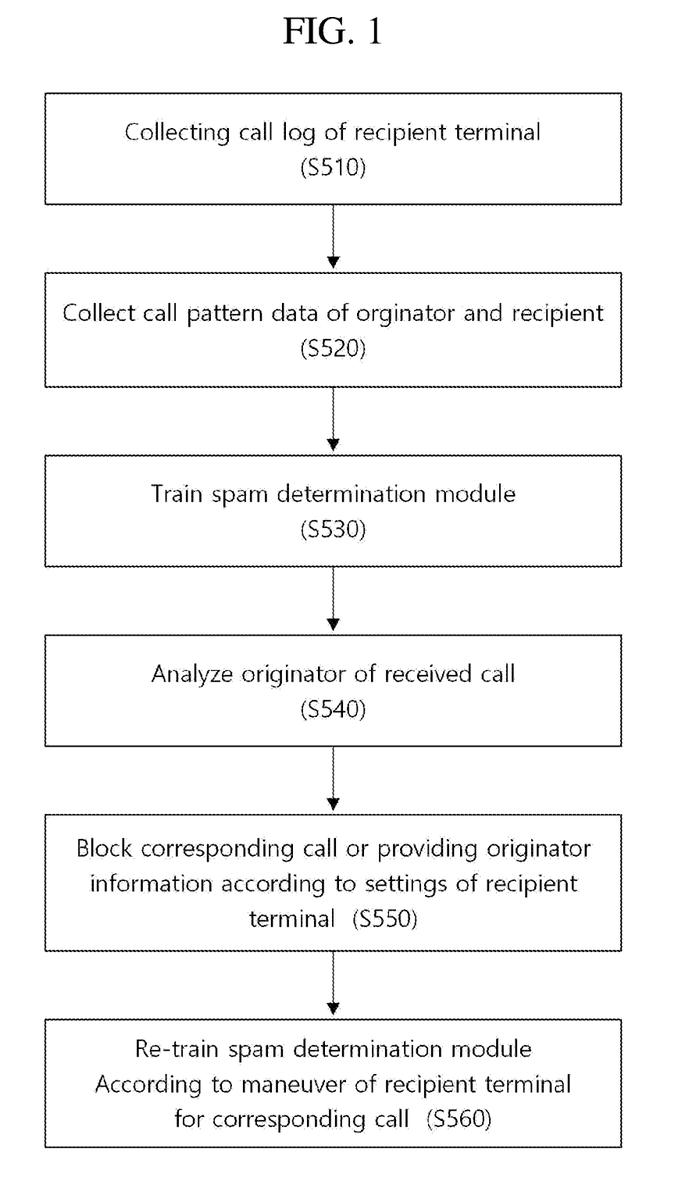
FIG. 1 is a flow chart of a spam blocking method using a call log analysis according to an embodiment of the inventive concept.
Figure 2:
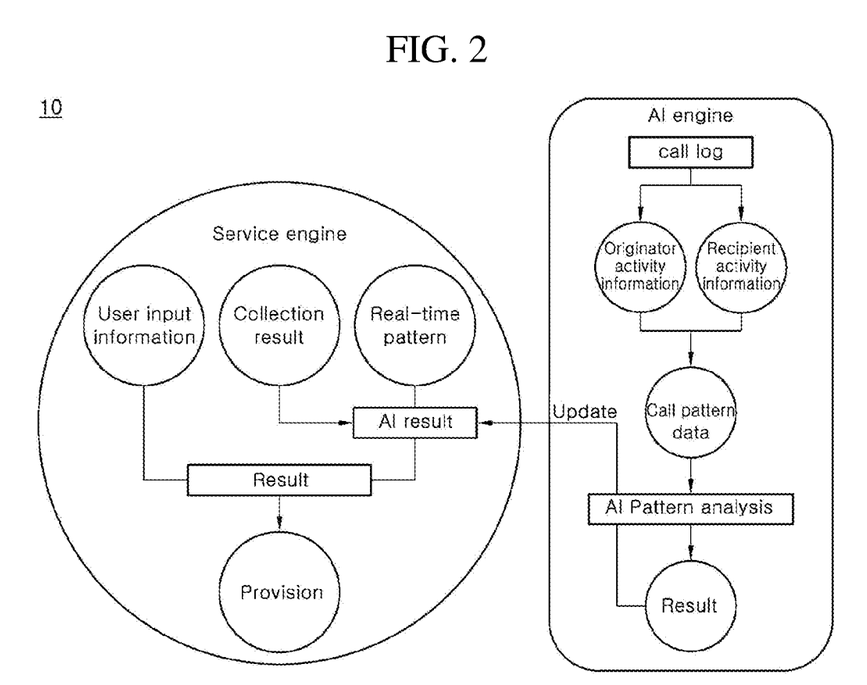
FIG. 2 is a schematic diagram of a spam blocking device according to an embodiment of the inventive concept.

FIG. 1 is a flow chart of a spam blocking method using call log analysis according to an embodiment of the inventive concept, FIG. 2 is a schematic diagram of a spam blocking device 10 according to an embodiment of the inventive concept, and FIGS. 3 to 7 are diagrams illustrating examples of providing originator information according to a determination result of a spam determination module 130.

Hereinafter, a spam blocking method using call log analysis according to an embodiment of the inventive concept will be described with reference to FIGS. 1 to 7.

The spam blocking method according to the embodiment of the inventive concept may be executed by a computer and in more detail, may be implemented in the form of the spam blocking device 10 or a spam blocking server 100. In the following description related to the spam blocking method, it is assumed that the device 10 will be given as a subject.

In addition, in the embodiments of the inventive concept, activities of a recipient and an originator may mean what are made by terminals 400 of the recipient and the originator.

First, a collection unit 110 of the spam blocking device 10 may collect a call log of a recipient terminal 300 (S510).

In more detail, when a recipient receives a call or text, the spam blocking device 10 may provide information on whether the received call or text is a spam call or text to the recipient terminal 300 and store a corresponding call log in a database 150.

In this case, the spam blocking device 10 may provide a spam service customized for each individual by individually managing information on users (recipients) using the service.

In this case, the call log may include a phone number of the originator terminal, a recipient ID, a reception time, whether a response is made, whether a phone number of the originator terminal 400 is registered in an address book of the recipient terminal 300, and the like.

Subsequently to S510, the collection unit 110 of the spam blocking device 10 may collect call pattern data of the originator and the recipient based on the call log (S520).

The call pattern data of the originator may include a daily average call origination rate of the originator, a concentration rate of originated calls during a specific time, a call response rate, a call origination rate on each time zone, a call response rate by phone number type, an activity rate on each day of week, a call origination rate for the same number, and a match rate between activities before and after a suspended period, an address book registration rate, and the like.

In more detail, the daily average call origination rate of the originator may mean the number of originated calls by the originator and the call response rate may mean a rate of responses for incoming calls, which may further include a call response rate when the phone number of an originator is unknown.

The call origination rate on each time zone may mean how the number of originated calls are distributed according to each time zone.

The concentration rate of originated calls during a specific time may mean how much originated calls are concentrated for a certain time in each time zone.

The call response rate by phone number type may mean a call response rate according to an international call, a wired call, a wireless call, or a special number, such as 070 or 080, and the call origination rate on each time zone may be calculated by classifying and storing calls according to working hours (09:00 to 19:00 hours) and hours outside the working hours (19:00 to 24:00 hours).

The activity rate on each day of week may mean an activity rate on weekdays (Monday to Friday) and weekends (Saturday and Sunday) and may further include an activity rate on holidays.

The call origination rate for the same number may mean the number of originated calls for the same number or the probability that the originator originates a call for the same number.

The match rate between activities before and after a suspended period may represent an index to determine whether an originator is the same as an existing originator based on the match rate between the activities before and after the suspended period when the phone number of the originator is a phone number having the suspended period of 1 month or more.

The address book registration rate may mean the probability that the recipient registers a phone number in an address book when a call with an unknown phone number is received.

The above examples are some of those applicable as the originator's call pattern data in the embodiment of the inventive concept, but are not limited thereto.

The call pattern data of a recipient may include a call response rate of the recipient, a non-identified number-call response rate, a response rate on each time zone, a call response rate by phone number type, a call response rate on each day of week, a call response rate for the same number, and the like.

The call response rate of the recipient may mean the probability that the recipient responds to a call received by the recipient terminal (except for calls that are not connected, such as rejected or missed calls).

The non-identified number-call response rate may mean the probability that recipient responds to a call with an unknown phone number when the call is received.

In more detail, the call response rate on each time zone may be classified into a call response rate before work hours, a call response rate during work hours, and a call response rate after work hours, the call response rate by phone number type may mean a call response rate according to an international call, a wired call, a wireless call or a special number, such as 070 or 080, and the call response rate on each day of the week may be classified according to weekdays, weekends, and holidays.

The above examples are some of those applicable as the recipient's call pattern data in the embodiment of the inventive concept, but are not limited thereto.

In this case, whether a response to a call is made may be classified into call response, call rejection, call termination after the response, and call missing, and the call termination after the response may be classified according to a call duration time after the response according to preset conditions.

For example, when the recipient has terminated a call without conversation for more than 10 seconds or 20 seconds after the response and an originator of the corresponding call is not stored in the address book of the recipient terminal 300, the corresponding call may be recognized as a spam call.

As described above, the call log and the call pattern data of the originator/recipient collected through the collection unit 110 may be stored in the database 150.

Next, in S520, the spam blocking device 10 may train the spam determination module 130 by using the call pattern data (S530).

In this case, the artificial intelligence of the spam determination module 130 will be trained using the Gaussian Naive Bayes artificial intelligence logic.

The artificial intelligence may analyze a call pattern for a phone number of each originator terminal 400 and each recipient ID to be trained with respect to whether a call is a necessary call or an unnecessary spam call for each user (recipient).

The learning method for machine learning may include various learning methods such as Gradient descent based learning, Probability theory based learning, Information theory based learning, and Distance similarity based learning.

By applying the probability theory based learning method among those, the spam determination module 130 may be trained to analyze the pattern of calls and inform the user of whether a call is a spam call or a voice phishing call, in the spam blocking method using call log analysis according to an embodiment of the inventive concept.

The spam determination device 10 may use Naive Bayes' theorem that is a representative artificial intelligence logic of the probability theory based learning, and the Naive Bayes' theorem may solve the complex problem simply and have an advantage of being easy to calculate relationships between variables individually.

Naïve Bayes Classifier $$P(Y \mid X_1 \cap X_2) = \frac{P(Y)P(X_1 \cap X_2 \mid Y)}{P(X_1 \cap X_2)} = \frac{P(Y)P(X_1 \mid Y)P(X_2 \mid Y)}{P(X_1)P(X_2)}$$

$$P(Y_c \mid X_1, \ldots, X_n) = \frac{P(Y_c)\prod_{i=1}^{n} P(X_i \mid Y_c)}{\prod_{i=1}^{n} P(X_i)} \quad Y_c \text{ is a label}$$

[Equation 1]

A Naive Bayes' basic equation may be expressed as Equation 1, and the spam determination module 130 may calculate a probability that a call received by the recipient terminal 300 is a call which the recipient is safe to respond to, and a probability that the call is a spam call or a voice phishing call based on the basic equation, select one with a higher probability, and inform a user terminal of the probability.

In Equation 1, P (Y$_c$) denotes a previous probability, and is calculated by the spam determination module 130 by applying the probability that a call received by the recipient terminal 300 is a call which the recipient is safe to respond to, and the probability that the call is a spam call or a voice phishing call based on the basic equation until the present time from the past.

In Equation 1, $$\prod_{i=1}^{n} P(X_i \mid Y_c)$$

is the part of a likelihood and is classified into a multinomial Naive Bayes or a Gaussian Naive Bayes depending on whether each pattern variable has the form of a Multinomial or continuous value.

In this case, since all the above values for the pattern of the telephone correspond to continuous values, the Gaussian Naive Bayes learning method is used.

The Gaussian Naive Bayes learning method may implement the Naive B ayes with the probability that the corresponding x on the probability density function is found.

A calculation formula for the Likelihood of the Gaussian Naive Bayes is as follows.

Gaussian Naïve Bayes $$P(x_i \mid Y_c) = \frac{1}{\sqrt{2\pi\sigma_{Y_c}^2}} \exp\left(-\frac{(x_i - \mu_{Y_c})^2}{2\sigma_{Y_c}^2}\right), \quad \text{[Equation 2]}$$

In Equation 2, the mean and standard deviation of Xi for a specific Yc are applied to μ and σ.

The Naive Bayes' basic equation implemented with the calculation formula for the Likelihood is as follows.

$$P(Y_c \mid X_1, \ldots, X_n) = \frac{P(Y_c)\prod_{i=1}^{n} P(X_i \mid Y_c)}{\prod_{i=1}^{n} P(X_i)}, \quad \text{[Equation 3]}$$

$$P(x_i \mid Y_c) = \frac{1}{\sqrt{2\pi\sigma_{Y_c}^2}} \exp\left(-\frac{(x_i - \mu_{Y_c})}{2\sigma_{Y_c}^2}\right)$$

Through the above equation, a higher probability is selected by obtaining a probability P(Y$_1$|X$_1$, . . . , X$_n$) that a call is a call which the recipient is safe to respond to and a probability P(Y$_0$|X$_1$, . . . , X$_n$) that a call is a dangerous call.

Subsequently to S530, when a call is received by the recipient's terminal, the spam determination module 130 may analyze an originator of the call (S540).

More specifically, it may mean that the spam determination module 130 analyzes call pattern data of the originator of the call.

Then, the spam determination module 130 may determine whether to block the corresponding call or text according to the analysis result and the call propensity of the recipient, and an information providing module 170 may provide originator information of the call to the recipient terminal 300 (S550).

Next, the computer may re-train the spam determination module 130 according to the maneuver of the recipient terminal 300 for the call (S560).

More specifically, when a call is received by the recipient's terminal, the spam blocking device 10 may identify an originator of the corresponding call, and the spam determination module 130 may analyze call pattern data of the originator who makes a call using the artificial intelligence trained and built up until the present time.

Furthermore, the spam determination module 130 may determine whether to block the corresponding call according to the analysis result of the call pattern data of the originator and the recipient's call propensity.

In this case, the spam determination module 130 may be trained about the call propensity of the recipient by using the call log and call pattern data of the recipient's terminal through S530.

Therefore, the spam blocking device 10 according to an embodiment of the inventive concept may not apply spam processing strategy to all recipients even with respect to the same originator, and the spam determination module 130, which has been trained through the call pattern data of the recipient may determine whether a call is a spam call in a customized manner for each recipient.

In addition, the spam determination module 130 may determine whether a call is a spam call by also considering the time when the call is received by the recipient's terminal since the spam determination module 130 is trained using response rates on each day of week and each time zone when being trained using call pattern data of the originator and the recipient.

In summary, consideration of the call propensity of the recipient may mean the call propensity of the recipient and may mean that, when a call received from an originator A at 2 pm on Wednesday, the call may be processed as a spam call in consideration of the recipient's call propensity, but when a call is received from the same originator at 2 pm on Saturday, the call may not be processed as a spam call.

In addition, considering the call propensity of the recipient may mean that spam processing may not be performed in the recipient C even when spam processing is performed in the recipient B with respect to the same call.

Therefore, since whether or not a call is a spam call is determined even using the user's (recipient's) call propensity, whether or not the call is a spam call may be determined differently depending on time zones in which the call is made, even when the same originator make the call the same recipient.

In addition, the spam determination module 130 may determine whether a call is a spam call based on the call pattern data of the originator based on a trained model, rather than based on the selected information, such as whether a specific number is selected as a safe number or a spam number by a plurality of users as in the conventional cases.

Therefore, it is possible to quickly determine whether a call is a spam call even with respect to a new spam call or a call with no report history.

In S540, whether or not to block a call is determined according to the determination result of the spam determination module 130, and when a corresponding number is directly blocked in the recipient's terminal, the spam determination module 130 may automatically block the corresponding call. In addition, when the recipient terminal 300 is set to the call blocking mode, a phone number not stored in a phone book of the recipient terminal 300 may be automatically blocked.

According to an embodiment, in S540, the spam determination module 130 may calculate a probability that an incoming call is a spam call or a voice phishing call using the Naive Bayes' theorem.

In addition, in S540, the spam determination module 130 may analyze an originator of a call received by the recipient's terminal to calculate a spam index, and when a spam blocking setting is activated, determine whether to block a corresponding call by comparing a spam blocking level set in the recipient terminal 300 and a spam index of the originator.

In more detail, the spam blocking device 10 may provide a plurality of spam blocking levels, one of which may be selected through the recipient terminal 300. For example, assuming that spam blocking levels of level 1 to level 5 are provided, the level 5 is selected by the user, and all unknown phone numbers are blocked, the spam blocking device 10 may block a corresponding call even though a spam index of an originator is low, as a spam blocking level set in the recipient terminal 300 increases.

In addition, re-training step (S560) may mean re-training the spam determination module 130 according to how the recipient responds to the corresponding call and, in more detail, re-training the spam determination module 130 according to a corresponding maneuver among call-response, call-rejection, a call duration time after the response and call missing.

In this case, when the recipient terminal 300 receives a call, the spam determination module 130 may determine that the call is rejected when the call duration time is less than or equal to a predetermined time after the response and perform re-training using the fact that the call is a spam call.

For example, when the recipient responds to a call with unknown phone number but terminates the call only after ten seconds, it is determined that the corresponding call is not necessary or beneficial to the recipient and re-training may be performed with respect to the fact that an originator of the call makes a spam call or a voice phishing call As described above, the spam blocking device 10 according to an embodiment of the inventive concept may collect call pattern data of a recipient and an originator by using a call log of the recipient and train the artificial intelligence of the spam determination module 130. Of course, the spam blocking device 10 may individually reflect the latest propensity with respect to each of recipients by re-training the artificial intelligence through feedback whenever a call is received by the recipient terminal 300.

According to one embodiment, in the re-training step, the spam blocking device 10 may determine whether a unresponsive call by the recipient is on purpose based on previous call history data for a corresponding originator of the recipient terminal 300 when the recipient terminal 300 does not respond to the call.

More specifically, there may be a situation in which the recipient may not respond to a call with a unknown phone number to a recipient on purpose when the call is received or a situation in which the recipient did not known that the call is received.

Therefore, the spam blocking device 10 may determine whether an unresponsive call by the recipient is on purpose based on previous call history data of the recipient for the corresponding originator when the recipient does not take any action on a specific call. For example, when the recipient had rejected a call from the originator several times, the spam blocking device 10 may determine that the unresponsive call is a rejected call.

Alternatively, it may be determined that the recipient has missed the call with respect to the unresponsive call when the recipient has talked to a corresponding originator on a phone several times before.

According to one embodiment, the spam blocking device 10 may determine whether an unresponsive call by the recipient is on purpose through the call log of the recipient terminal 300 within a predetermined time from the occurrence time of the unresponsive call.

Figure 3:
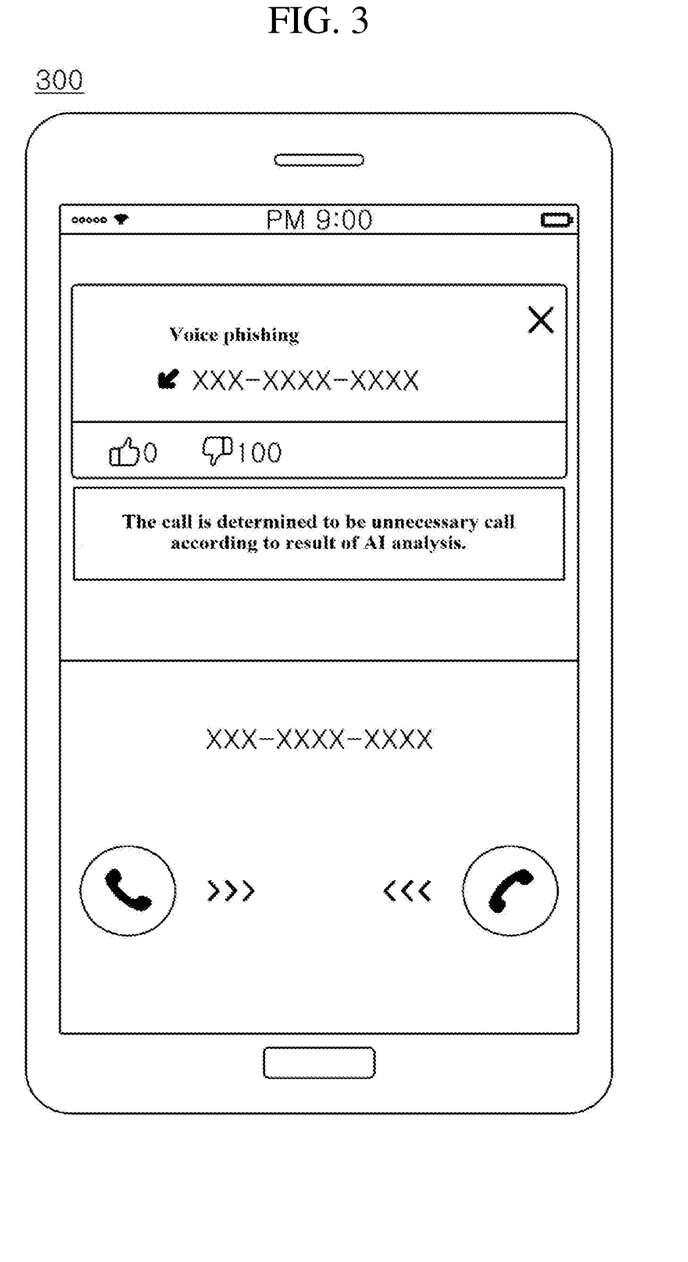
FIGS. 3 to 7 are diagrams illustrating examples of providing originator information according to a determination result of a spam determination module.

FIG. 3 is a diagram illustrating an example in which the spam determination module 130 determines that a call is a voice phishing call.

As shown in FIG. 3, in the spam blocking device 10, the information providing module 170 may provide a message representing that a call is not blocked but is suspected to be a voice phishing call according to a result of the spam determination module 130, may identify a phone number and the message and decide whether to respond to the call.

In this case, when the recipient rejects the call or terminates the call before a certain time has elapsed after responding to the call, the spam determination module 130 may be re-trained using the fact that the call is a spam call, and a spam index of a corresponding originator may increase.

When the spam index of the corresponding originator increases higher than a threshold because such a situation has been repeated and it is determined that the corresponding originator is an originator of spam or voice phishing, the spam determination module 130 may automatically block a call made by the originator for the recipient.

Figure 4:
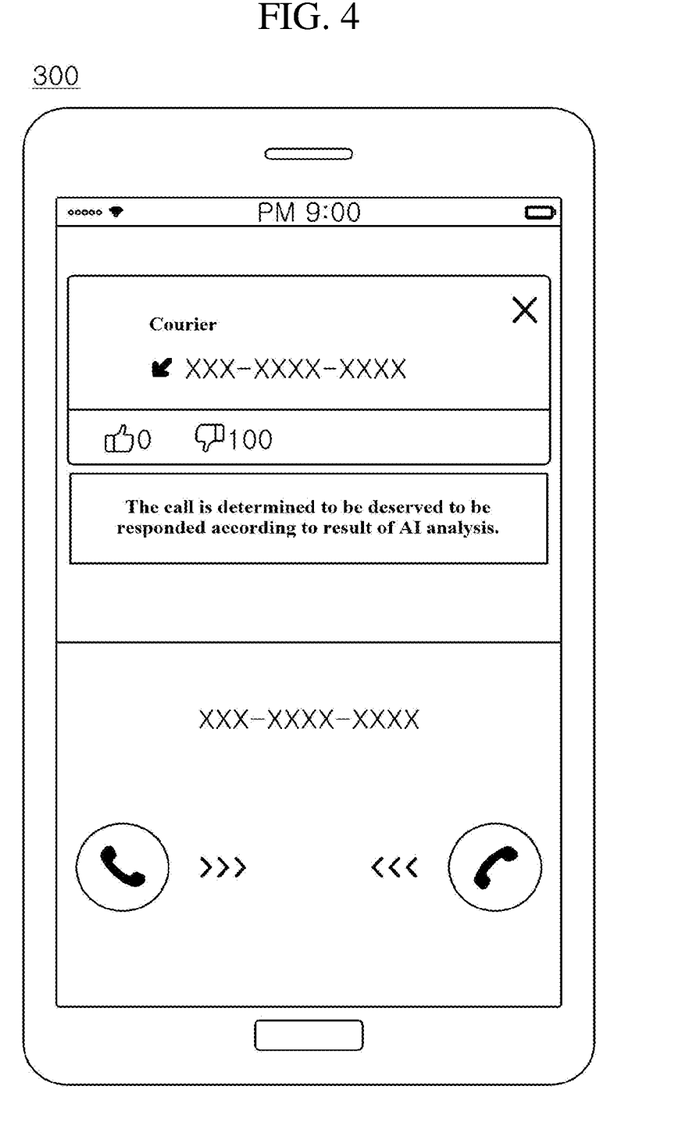

FIG. 4 is a diagram illustrating an example in which the spam determination module 130 determines that an originator of a corresponding call is a courier and provides information representing that the call is deserved to be responded by the recipient terminal 300.

In this case, when the recipient is not in a particular situation, such as a situation in which the recipient is busy work, the recipient will respond to a call, and simply talk to a courier.

The spam determination module 130 may be re-trained according to the maneuver of the recipient terminal 300 for the call in the re-training step. Although it is described that the spam determination module 130 determines that the call is rejected when a call duration time is less than or equal to a predetermined time after the response to the call, exception handing may be performed on a call made by an originator of which the personal identity is granted.

This means that most of calls between the recipient and the courier may be treated as exceptions because calls such as delivery inquiries end shortly.

Figure 5:
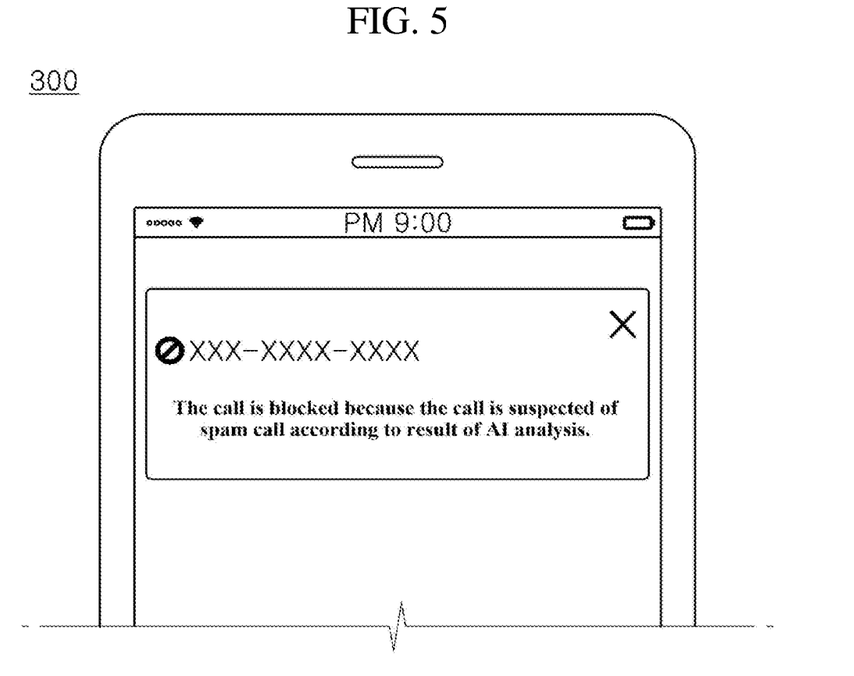

FIG. 5 is a diagram illustrating an example in which the spam determination module 130 automatically blocks a call because it is determined that the call is a spam call with respect to a corresponding recipient.

FIG. 3 illustrates an example in which the spam blocking device 10 has provided information on an originator because the call was suspected of a spam call, and FIG. 5 illustrates an example in which a call is automatically blocked because it is definitely determined that the call is a spam call.

According to one embodiment, the spam blocking device 10 may automatically block the call, provide information on an originator, and provide a function for enabling a user to input a feedback.

Figure 6:
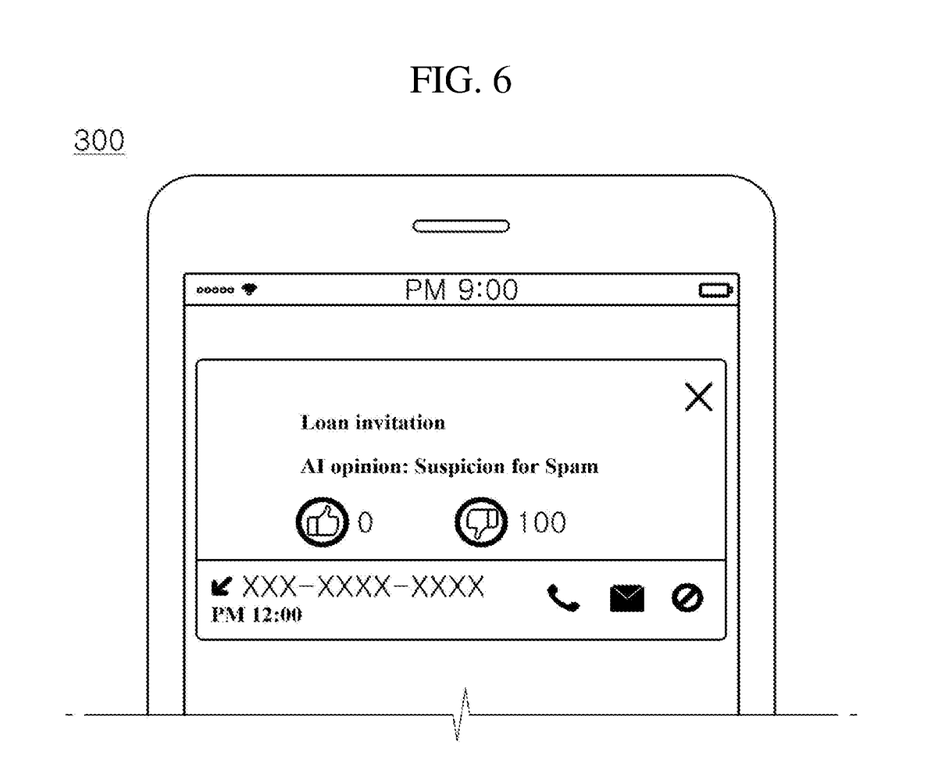

FIG. 6 is a diagram illustrating an example in which the spam blocking device 10 requests feedback of a corresponding number and an originator from the recipient terminal 300 after a recipient has terminated a call.

Therefore, when it is determined that a call is a spam call even though the recipient responds to the corresponding call, the spam determination module 130 may be re-trained through the feedback input by the recipient.

Figure 7:
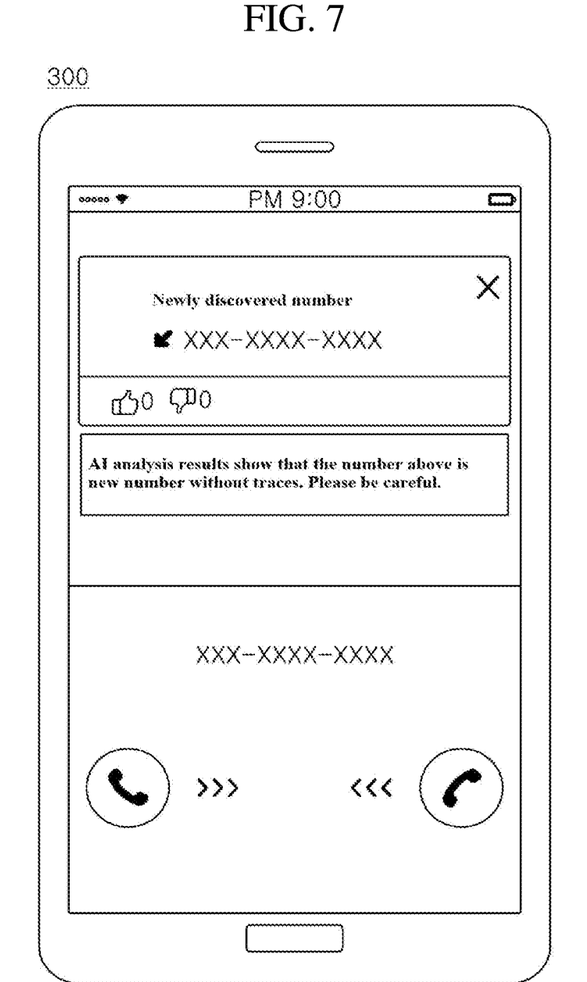

FIG. 7 is a diagram illustrating an example in which information indicating that there is a need to be careful is provided to the recipient terminal 300 because originator information of a corresponding call represents a new phone number that has never been recorded in the spam blocking device 10.

More specifically, the spam blocking device 10 may provide a warning message to the recipient terminal 300 when the call pattern data for the number of the originator is less than or equal to a reference value or the number of the originator is a new number.

Therefore, when the past activity of the new phone number is not collected at all, the spam blocking device 10 may provide information, to the recipient terminal 300, representing that there is a need to be careful for the new phone number until the call pattern data is collected enough to analyze the pattern and the spam determination module 130 is trained.

According to one embodiment, in the case where a call log of a specific originator is re-collected after a certain suspended period, the spam determination module 130 may collect call pattern data from a re-collecting time point and determine whether to maintain the specific originator as a same originator as an existing originator or to register the specific originator as a new originator according to a match rate between call pattern data before and call pattern data after the suspended period.

For example, when the call log of a particular originator has not been collected for two months and started to be recollected from a particular day, the particular originator may be an originator before a suspended period or a new originator.

Therefore, the spam determination module 130 may collect the call pattern data from the time of recollection separately and compare the call pattern data before and after the suspended period. When a match rate is greater than or equal to a first reference value, the spam determination module 130 may determine that an originator is the same as an existing originator and incorporate the call pattern data. When the match rate is less than or equal to a second reference value, the spam determination module 130 may determine that an originator is a new originator and collect call pattern data and perform training as the new originator.

In one embodiment, the spam blocking device 10 may receive a specific text message selected from a text message box of the recipient terminal 300.

Then, the spam determination module 130 may analyze the contents of the text message to determine whether the text message is a spam text message and may be re-trained with respect to an originator of the text message using the determination result.

Figure 8:
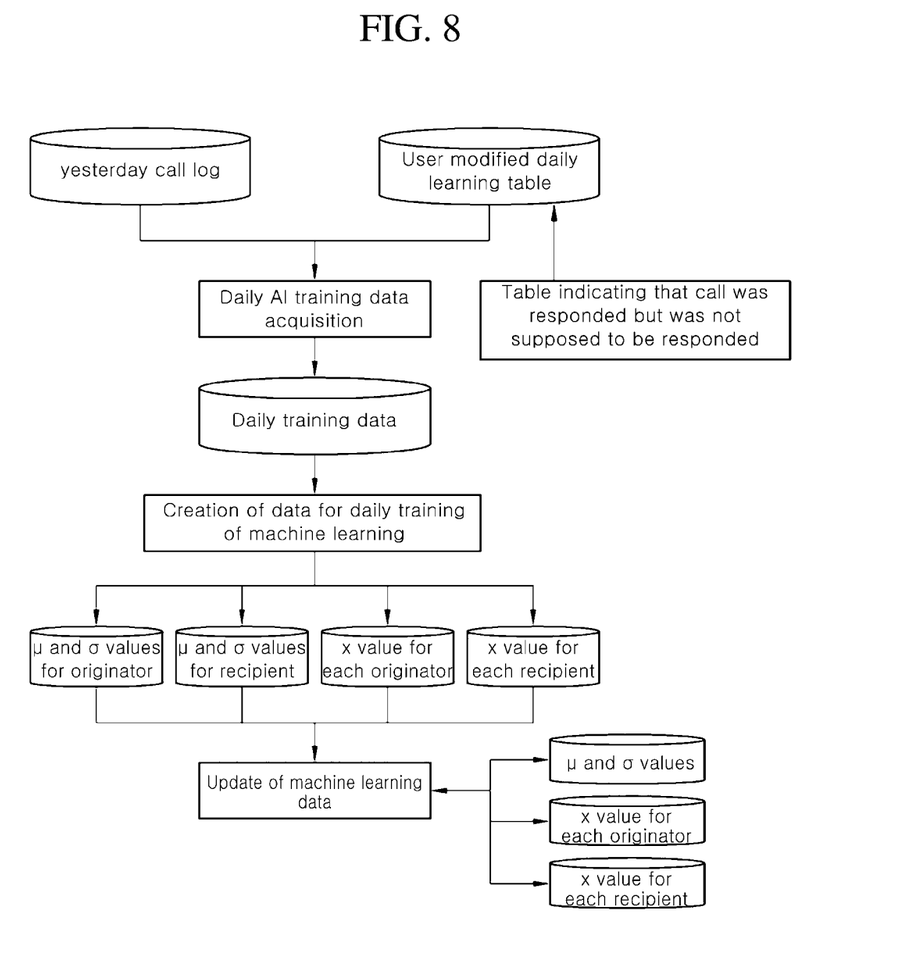
FIG. 8 is a diagram illustrating an example in which a spam blocking device according to an embodiment of the inventive concept processes training using daily machine learning data.

FIG. 8 is a diagram illustrating an example in which a spam blocking device according to an embodiment of the inventive concept processes training using daily machine learning data.

FIG. 8 illustrates an example which is the same as the spam blocking method described with reference to FIGS. 1 to 7, and processing of each value is illustrated as processing by date.

The spam blocking device 10 may collect a recipient's yesterday call log and user-modified daily learning table.

In this case, the user-modified daily learning table corresponds to a maneuver of the recipient terminal for the call (corresponds to S560, for example, a table indicating that the recipient has respond to, but should not respond to a call).

As described above, the spam blocking device 10 may secure daily training data by obtaining daily artificial intelligence training data, generate daily machine learning data for training based on this and train the spam determination module 130.

In this case, the machine learning data may be updated by being classified into $\mu$ and $\sigma$ values for an originator, $\mu$ and $\sigma$ values for a recipient, an "x" value for each originator, and an "x" value for each recipient as shown in FIG. 8.

The values may correspond to the values of the likelihood calculation equation as the equation 2 in which the x value represents a current value of an object to be analyzed, the $\mu$ value represents the average value of a sample group to which the object to be analyzed belongs, and the $\sigma$ value represents the standard deviation value of the sample group to which the object to be analyzed belongs.

Figure 9:
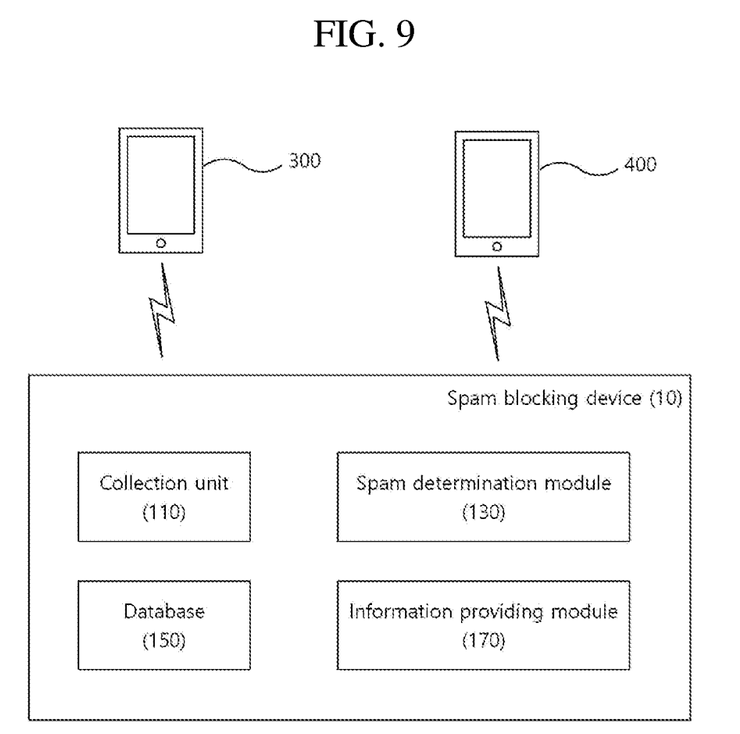
FIG. 9 is a block diagram of a spam blocking device using call log analysis according to an embodiment of the inventive concept.

FIG. 9 is a block diagram of the spam blocking device 10 using call log analysis according to an embodiment of the inventive concept.

However, in some embodiments, the spam blocking device 10 may include fewer components or more components than the components shown in FIG. 1.

Referring to FIG. 9, the spam blocking device 10 using call log analysis according to an embodiment of the inventive concept may include the collection unit 110, the spam determination module 130, the information providing module 170, and the database 150.

The collection unit 110 may collect call log of the recipient terminal 300, collect the call pattern data of an originator and a recipient based on the call log, and store the collected call pattern data in the database 150.

The spam determination module 130 may be trained using the call pattern data to analyze an originator of a corresponding call and determine whether to block the call according to an analysis result and a call propensity of the recipient when a call or a text is received in the recipient terminal.

The information providing module 170 may provide originator information of the call to the recipient terminal 300.

In this case, the spam determination module 130 may perform re-training according to the maneuver of the recipient terminal 300 for the call.

The spam blocking device 10 according to an embodiment of the inventive concept described above is the same as the spam blocking method described with reference to FIGS. 1 to 8, except for the category thereof, and a redundant description and examples will be omitted.

The method according to an embodiment of the inventive concept described above may be implemented as a program (or an application) and stored in a medium so as to be coupled and executed to a server which is hardware.

The above-described program may include codes coded in a computer language, such as C, C++, JAVA, or a machine language, which are readable by a processor (CPU) of the computer through a device interface of the computer such that the computer reads the program and execute the methods implemented by the program. The codes may include functional codes associated with a function defining functions necessary to execute the methods or the like, and include control codes associated with an execution procedure necessary for the processor of the computer to execute the functions according to a predetermined procedure. In addition, the codes may further include memory reference codes indicating at which location (address number) of the computer's internal or external memory additional information or media required for the computer's processor to execute the functions can be referenced. In addition, when the processor of the computer needs to communicate with any other computer or server remotely to execute the functions, the codes may further include communication related codes related to how to communicate with the other computer or server at a remote location, what information or media is to be transmitted and received during communication, by using the communication module of the computer.

The media may mean a media that stores data semi permanently and is readable by a device rather than a media that stores data for a short time such as a register, a cache, a memory, and the like. Specifically, examples of the medium may include, but are not limited to, a read only memory (ROM), a random access memory (RAM), a CD-ROM, a magnetic tape, a floppy disk, an optical data storage device, and the like. That is, the program may be stored in various recording media on various servers to which the computer can access or various recording media on the computer of a user. The medium may also be distributed to a computer system connected thereto through a network and store computer readable codes in a distributed manner.

The steps of a method or algorithm described in connection with the embodiments of the inventive concept may be implemented directly in hardware, in a software module executed by hardware, or in a combination thereof. The software module may reside in a random access memory (RAM), a read only memory (ROM), an erasable programmable ROM (EPROM), an electrically erasable programmable ROM (EEPROM), a flash memory, a hard disk, a removable disk, a CD-ROM, or in a computer readable recording medium that is well known in the art.

Although embodiments of the inventive concept have been described above with reference to the accompanying drawings, it is understood that those skilled in the art to which the inventive concept pertains may implement the inventive concept in other specific forms without changing the technical spirit or essential features thereof. Therefore, it should be understood that the embodiments described above are exemplary in all respects and not restrictive.

According to the inventive concept as described above, the spam determination module may be trained using the call pattern data of the originator and the recipient secured based on the call log, thus accurately determining whether a call is a spam call compared to the existing methods and reflecting each user's call propensity for determination of a spam call.

In addition, according to the inventive concept, it is possible to train an algorithm in real time by re-training the spam determination module according to how the recipient terminal deals with an incoming call.

In addition, according to the inventive concept, it is possible to determine whether a call is a spam call with respect to a call with no spam report history, which is unknown by collecting the call pattern data and performing training based on a call log, not determine whether a call is a spam call depending on spam report as in a conventional case.

The effects of the inventive concept are not limited to the aforementioned effects, and any other effects not mentioned herein will be clearly understood from the following description by those skilled in the art.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A spam blocking method performed by a computer, comprising:
   collecting a call log of a recipient terminal;
   collecting call pattern data of an originator and a recipient based on the call log;
   training a spam determination module using the call pattern data;
   when a call or a text is received by the recipient's terminal, analyzing, by the spam determination module, the call pattern data of the originator;
   calculating a spam index of the originator;
   determining, by the spam determination module, whether to block the call or the text according to an analysis result of the call pattern data of the recipient and a time at which the call or the text is received, wherein the call pattern data of the recipient includes a non-identified number-call response rate of the recipient, a call response rate on each time zone, and a call response rate on each day of week;
   providing originator information of the call or the text to the recipient's terminal; and
   re-training the spam determination module according to a maneuver of the recipient's terminal to the call,
   wherein the re-training comprises:
     increasing, by the spam determination module, the spam index of the originator for the recipient when the recipient rejects the call, or terminates the call before a predetermined time has elapsed after responding to the call, and
   wherein the determining comprises:
     providing, by the spam determination module, a plurality of spam blocking levels such that one of the plurality of spam blocking levels is received from the recipient's terminal; and
     determining, by the spam determination module, whether to block the received call or the received text by comparing a spam blocking level set by the recipient's terminal with the spam index of the originator when a spam blocking setting is activated in the recipient's terminal.

2. The spam blocking method of claim 1, wherein the spam determination module uses a Gaussian Naive Bayes artificial intelligence logic,
   wherein the providing of the originator information includes calculating a probability that the call or the text is a spam or voice phishing call using a Naive Bayes' theorem.

3. The spam blocking method of claim 1, wherein the collecting of the call pattern data includes collecting the call pattern data of the originator including at least one of a daily average call origination rate of the originator, a concentration rate of originated calls during a specific time, an average call response rate, a call origination rate on each time zone, the call response rate by phone number type, an activity rate on each day of week, a call origination rate for a same number, and a match rate between activities before and after a suspended period.

4. The spam blocking method of claim 1, wherein the re-training of the spam determination module includes re-training the spam determination module according to a corresponding maneuver among call response, call rejection, a call duration time after the call response, and a missed call of the recipient's terminal, and determining the call rejection when the call duration time is less than or equal to another predetermined time.

5. The spam blocking method of claim 4, wherein the re-training of the spam determination module includes determining whether an unresponsive call by the recipient is on purpose based on previous call history data of the recipient's terminal for a relevant originator when the recipient's terminal does not respond to the call.

6. The spam blocking method of claim 1, wherein the providing of the originator information includes providing an alert message to the recipient's terminal when call pattern data of a corresponding originator is less than or equal to a reference value or indicates a new number.

7. The spam blocking method of claim 1, wherein the spam determination module collects call pattern data from a time point when a call log of a specific originator is re-collected after a certain suspended period and determines whether to maintain the specific originator as a same originator as an existing originator or to register the specific originator as a new originator according to a match rate between call pattern data before and after the suspended period.

8. The spam blocking method of claim 1, wherein the spam index is calculated by the spam determination module, through analyzing the originator of the call received by the recipient's terminal.

9. A spam blocking device that performs the spam blocking method according to claim 1, the device comprising:
a collecting unit configured to collect the call log of the recipient terminal, and collect the call pattern data of the originator and the recipient based on the call log;
the spam determination module configured to be trained using the call pattern data to analyze the originator of the call or the text and determine whether to block the call or the text according to the call pattern data of the recipient when the call or the text is received in the recipient terminal; and
an information provision module configured to provide the originator information of the call or the text to the recipient's terminal,
wherein the spam determination module is re-trained according to the maneuver of the recipient's terminal to the call.

10. A spam blocking program coupled to the computer that is hardware and stored in a medium to perform a method according to claim 1.

* * * * *